United States Patent [19]

Maki

[11] Patent Number: 5,193,064
[45] Date of Patent: Mar. 9, 1993

[54] METHOD AND APPARATUS OF INTEGRATING GLOBAL POSITIONING SYSTEM AND INERTIAL NAVIGATION SYSTEM WITHOUT USING ACCELEROMETERS

[75] Inventor: Stanley C. Maki, Poway, Calif.

[73] Assignee: General Dynamics Corporation, Space Systems Division, San Diego, Calif.

[21] Appl. No.: 594,894

[22] Filed: Oct. 9, 1990

[51] Int. Cl.$^5$ .............................................. G06F 15/50
[52] U.S. Cl. ..................................... 364/454; 364/434; 244/176
[58] Field of Search ............... 364/449, 453, 443, 459, 364/434, 454; 244/176

[56] References Cited

U.S. PATENT DOCUMENTS

| | | | |
|---|---|---|---|
| 4,402,049 | 8/1983 | Gray | 364/447 |
| 4,405,986 | 9/1983 | Gray | 364/434 |
| 4,894,655 | 1/1990 | Joguet et al. | 364/449 |
| 4,899,285 | 2/1990 | Nakayama et al. | 364/453 |
| 4,903,212 | 2/1990 | Yokouchi et al. | 364/449 |

Primary Examiner—Thomas G. Black
Attorney, Agent, or Firm—John R. Duncan; Frank D. Gilliam

[57] ABSTRACT

A method and arrangement for integrating a Global Positioning System and an Inertial Navigating System without the use of accelerometers to provided a velocity steering signal that is utilized in the guidance of a flying vehicle, such as a space craft. The method and arrangement do not require the use of accelerometers. A mechanization for interfacing the integrated Global Positioning System and the Inertial Navigating System with a flight control system which controls a flying vehicle is disclosed.

5 Claims, 4 Drawing Sheets

A. TAYLOR 2-4 POINT DIFFERENTIATION

$V'_n = 1/6T \, [ \, 11V_{n-3} - 18V_{n-2} + 9V_{n-1} - 2V_n \, ]$
$V'_{n-1} = 1/6T \, [ \, -V_{n-2} + V_n \, ]$
$V'_{n-2} = 1/6T \, [ \, -2V_{n-3} - 3V_{n-2} + 6V_{n-1} - V_n \, ]$
$V'_{n-3} = 1/6T \, [ \, -11V_{n-3} + 18V_{n-2} - 9V_{n-1} + V_n \, ]$

B. ADAMS BASHFORTH 4th ORDER PREDICTOR

$V_{n+1} = V_n + 1/24 \, [ \, 55V'_n - 59V'_{n-1} + 37V'_{n-2} - 9V'_{n-3} \, ]$

C. AITKEN - NEVILLE CUBIC INTERPOLATION

$V_{n+\tau} = V_n + \tau/6T \, [ \, 2V_{n+1} + 3V_n - 6V_{n-1} + V_{n-2} \, ]$
$\qquad + \tau^2/2T^2 \, [ \, -V_{n+1} + 2V_n - V_{n-1} \, ]$
$\qquad + \tau^3/6T^3 \, [ \, V_{n+1} - 3V_n + 3V_{n-1} - V_{n-2} \, ]$

FIG. 5

METHOD AND APPARATUS OF INTEGRATING GLOBAL POSITIONING SYSTEM AND INERTIAL NAVIGATION SYSTEM WITHOUT USING ACCELEROMETERS

BACKGROUND OF THE INVENTION

The present invention relates generally to an improvement in the integration of a Global Positioning System and an Inertial Navigation System for a flying vehicle, such as a spacecraft, and more particularly, but not by way of limitation, to an integrated Global Positioning System and Inertial Navigation System for a flying vehicle which does not utilize accelerometers and the associated data processing and interface circuitry for guidance purposes.

The integration of a Global Positioning System (GPS) and an Inertial Navigation System (INS) has been accomplished in the past. A number of arrangements for this purpose are well known. Specific implementations of such arrangements may vary according to such factors as whether the gyroscopes are strapped down or platform mounted, the sources of error to be considered, whether the flying vehicle is an aircraft or a space vehicle, the guidance accuracy required, the dynamics of the vehicle, the prospect of outages of the GPS, and so forth. One feature that is common to all known actual and proposed integrated GPS/INS systems is the requirement to accelerometers to measure velocity increments which are then integrated, with the necessary coordinate transformations, to provide a vehicle velocity vector.

The purpose of this invention then is to eliminate the use of accelerometers and the associated data processing and interfacing circuitry requirements for an integrated GPS and INS guidance system for a flight vehicle. By doing so it is possible to reduce the cost and complexity of an integrated guidance system and to increase the reliability of such guidance systems for space launch vehicles and space transfer vehicles and any other type of flying vehicle to which such guidance system would be applicable. Further advantages of such an integrated guidance system that was able to eliminate the use of accelerometers besides reduced cost and complexity and increased reliability would include reduced power, weight, and volume, reduced checkout operations, and fewer integration interfaces. Also, for systems that do use acceleration sensing, the invention can backup in case of an acceleration failure.

Examples of the prior art that are of limited general interest are U.S. Pat. Nos. 4,173,785; 4,038,527; 3,330,503; and 2,973,927. U.S. Pat. No. 4,173,785 issued on Nov. 6, 1979 relates to an INERTIAL GUIDANCE SYSTEM FOR VERTICALLY LAUNCHED MISSILES WITHOUT ROLL CONTROL which when provided with a set of target position coordinates prior to launch of a vertically launched ordnance vehicle calculates the missile position and velocity in an inertially fixed coordinate system during flight. This guidance system functions without an active roll control by continuously pointing the velocity vector of the missile towards the target position. However, this patent does use an accelerometer and the associated circuitry to point the velocity vector. There is no control of the magnitude of the velocity as is required in most guidance applications since for guidance of a missile its accuracy requirements are minimal and in this instance there is only need of very short term accuracy. Such a system would not be sufficiently accurate for modern day launch vehicles.

U.S. Pat. No. 4,038,527 issued Jul. 26, 1977 for a SIMPLIFIED STRAPPED DOWN INERTIAL NAVIGATION UTILIZING BANG-BANG GYRO TORQUING relates to a self contained, strapped-down guidance system combining all axes, all attitude navigation having two wide angle, two-degree-of-freedom gyros which provide attitude angle and angular rate signals along three axes. A full trio of accelerometers provide signals representative of the acceleration along three orthogonally displaced axes. This system which resembles a standard inertial guidance system provides no long term correction for instrument drifts thereby resulting in reduced long term accuracy.

U.S. Pat. No. 3,330,503 issued Jul. 11, 1967 for a RE-ENTRY GUIDANCE SYSTEM discloses an acceleration monitoring guidance system for use with a lifting vehicle entering a planet's atmosphere at high velocity. This system is essentially a simple inertial system using a linear accelerometer located in the plane of symmetry of the vehicle for sensing dynamic pressure by measuring accelerations of the vehicle. The recorded acceleration is then used in conjunction with a preprogrammed timer to control lifting surfaces of the vehicle. This system is to be used in conjunction with a ground tracking station.

U.S. Pat. No. 2,973,927 issued Mar. 7, 1961 for MONITORING DEVICE FOR AUTOMATIC PILOT SYSTEMS relates to the monitoring of a dirigible autopilot that two pitch accelerometers that are part of the autopilot system that controls the control surfaces of the dirigible. The disclosed system requires radio navigation such as an ILS glide slope signal and due to low accuracy because of the low dynamics of the flying vehicle is not appropriate for space or aircraft application.

The above discussed prior art does not disclose an integrated GPS and INS guidance system which does not use accelerometers nor is the inventor aware of any guidance systems which are constructed to have this feature.

SUMMARY OF THE INVENTION

Briefly stated, the present invention contemplates a method and arrangement for integrating a GPS and an INS for a flying vehicle in a guidance system which includes utilizing preceding sampled position and velocity vectors by the GPS to predict current vehicle velocity and position vectors. The predicted current velocity vector and current position vector are used to generate a velocity vector to be gained. The predicted current vehicle velocity vector and the velocity vector to be attained are then used to determine a steering rate vector which is then utilized to determine the trajectory of the flying vehicle. The prediction of the current vehicle velocity vector includes providing a first element that is obtained from extrapolation of the past velocity component vector and a second element based on past values of predicted velocity and actual velocity or some other measurable elements of dynamic performance of the vehicle. Use of the integrated system of the present invention permits lower performance and lower cost gyros to be used in the associated flight control system.

The invention provides high precision accuracy for applications such as space launch vehicles and space transfer vehicles with the precision being reducible as required for pilot controlled vehicles.

Other advantages of the present invention will be readily apparent as the invention becomes better understood by reference to the following detailed description with the appended claims, when considered in conjunction with the accompanying drawings.

BRIEF DESCRIPTION OF THE DRAWINGS

FIGS. 5(A)-5(C) show a table of algorithms that may be used in the development of the velocity steering signal.

DESCRIPTION OF THE PREFERRED EMBODIMENT

Figure 1:
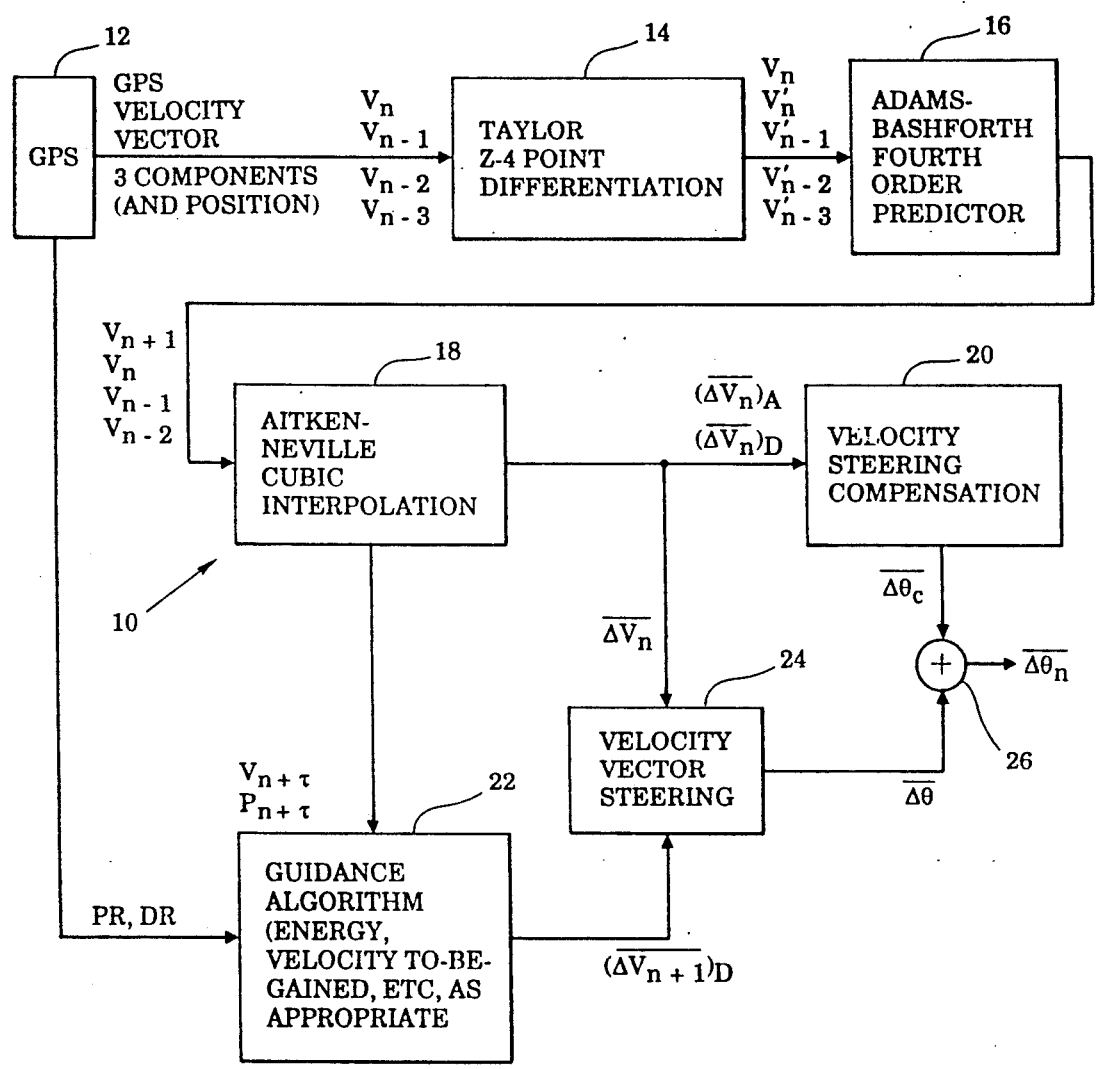
FIG. 1 is a simplified block diagram of a guidance system which integrates a GPS and an INS without requiring the use of accelerometers to provide a velocity steering signal.

Referring now to the drawings in detail, and in particular to FIG. 1, reference character 10 generally designates a guidance system which integrates a GPS and an INS without using accelerometers that is constructed in accordance with a preferred embodiment of the present invention. A suitable GPS receiver 12 generates three components of the velocity vector and also a position solution. Many existing GPS receivers provide a velocity and position solution once per second and some existing GPS receivers have a foreground solution rate for position and velocity at 10 times per second. Depending on specific vehicle dynamics and guidance accuracy requirements, guidance steering signals more often than 10 per second will probable not be required. However, the GPS velocity and position solution has some computations delay in it. For this reason, a predicted velocity, that is current for the time of application, is developed. For low dynamics vehicle applications, the velocity and position solutions may be used directly with their associated computations delays. The predicted velocity is obtained in two elements. The first element is obtained from extrapolation of the past velocity component curve.

This first element, the predicted velocity component, can be obtained by using suitable algorithms. As illustrated, the three components of velocity obtained from the GPS are applied to a circuit 14 that applies the Taylor 2-4 Point Differentiation as illustrated in the table of FIG. 5. The signals developed by the circuit 14 providing the Taylor 2-4 Point Differentiation are then applied to a circuit 16 that provides an Adams Bashforth 4th Order Predictor as seen in the table of FIG. 5. The signals developed by the circuit 16 are applied in turn to a circuit 18 that provides an Aitken Neville Cubic Interpolation. The Aitken-Neville Cubic Interpolation is provided since time for the most recent time of provided GPS value of velocity to the desired current time of velocity will not correspond to the increments of time T between GPS updates. These computations are performed for each of the three components of velocity. The current value of position can be obtained by the same means, or by integrating velocity over a time period and adding it to the last GPS position update.

The second element is the correction to this predicted velocity component based on past values of predicted velocity and actual velocity, and on any available measure of dynamic vehicle performance. This second element, to provide a compensated predicted velocity, is determined from the cross product of the orientation of the prior commanded delta velocity with the orientation of the actual delta velocity obtained, to provide a measure of orientation difference. The delta velocity magnitude difference is not utilized since thrust usually is not controllable, especially in spacecraft applications.

Figure 2:
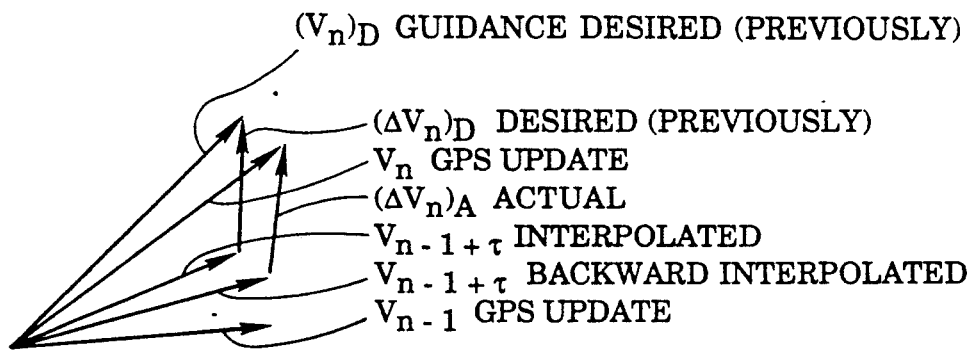
FIG. 2 is a simplified velocity vector diagram which illustrates the generation of a compensation component for the velocity steering signal generated by the flight control system of FIG. 1.

The prior commanded delta velocity and the prior actual velocity signals are obtained from the circuit 18 and are applied to a velocity steering compensation circuit 20. The velocity vector diagram that illustrates the development of the compensated predicted velocity is shown in FIG. 2.

A circuit 22 that provides the appropriate guidance algorithm is coupled to circuit 18 to receive the predicted velocity and position signals and is coupled to the GPS 12 to receive present position and velocity information. The circuit 22 provides the guidance algorithm to generate a velocity vector to be gained.

Figure 3:
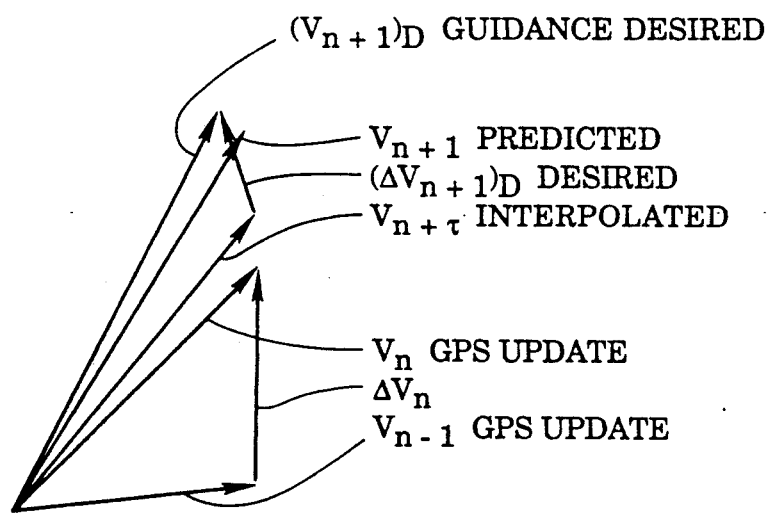
FIG. 3 is a simplified velocity vector diagram of the velocity steering signal generated by the guidance system of FIG. 1.

A circuit 24 to provide a velocity vector steering signal receives the velocity to be gained signal from the circuit 22 and the velocity to gained received from the circuit 18 to generate a steering rate vector that is coupled to an algebraic adder 26. The velocity steering compensation circuit 20 is also coupled to the adder 26 and added to the velocity steering vector to provide a compensated velocity steering vector. The development of the velocity vector steering provided by circuit 24 is shown in FIG. 3.

Figure 4:
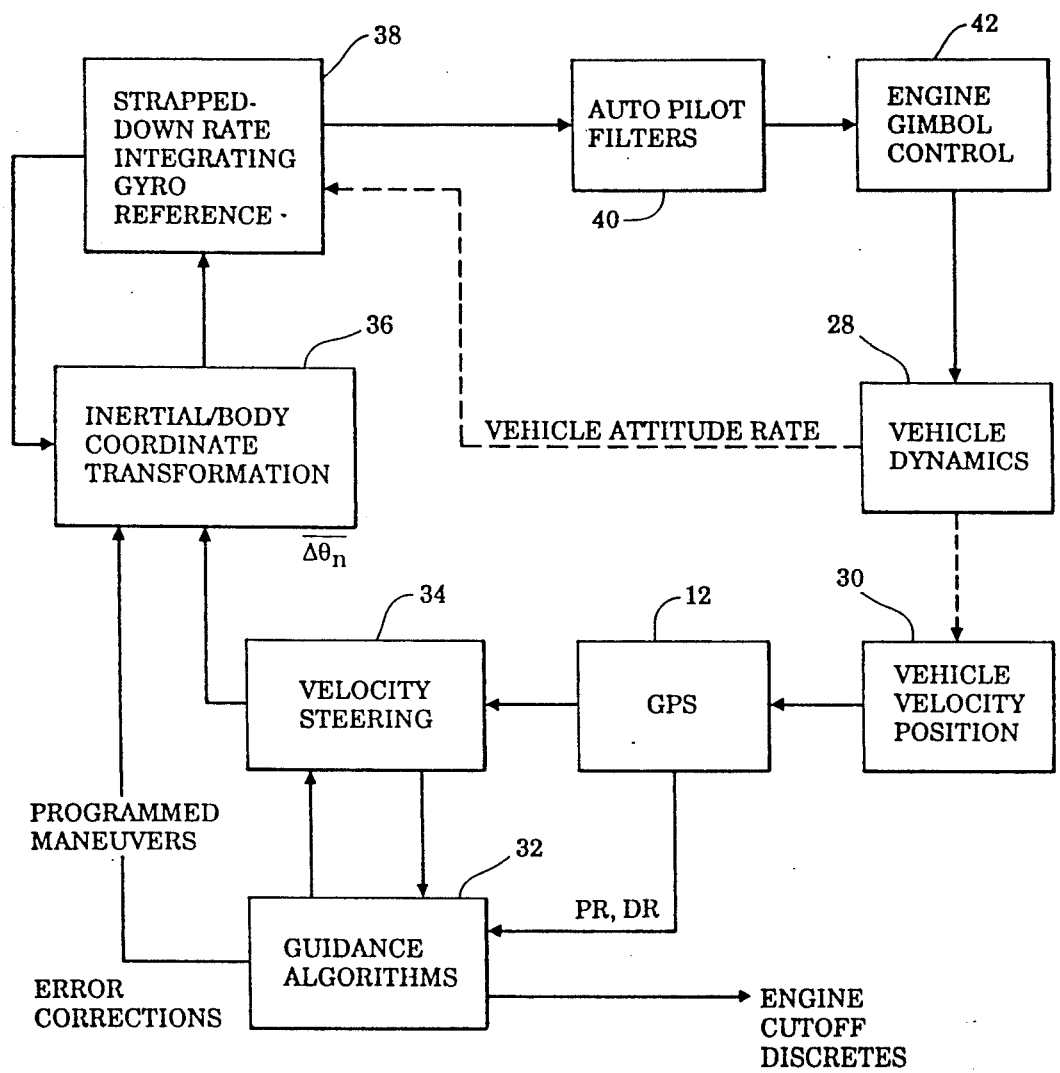
FIG. 4 is a simplified flight control system which is interfaced with the guidance system of FIG. 1 to utilize a velocity steering signal generated by the guidance system to control a flying vehicle, such as a spacecraft.

Referring now to FIG. 4, it will be illustrated how the velocity steering guidance system interfaces with a typical flight control system for control of a flying vehicle. The dynamics of a vehicle in flight are represented by reference character 28 provide vehicle velocity and position information as shown by character 30 and are provided to the GPS 12. The GPS provides position, pseudo range and velocity/delta range information to the guidance algorithms represented by circuit 32 and the information concerning position and the three components of the velocity vector to the velocity steering circuit 34. The circuits 32 and 34 process the GPS velocity and position information to provide the compensated velocity steering vector as seen more fully in FIG. 1.

The compensated velocity steering signal is then applied to a suitable inertial/body coordinate transformation matrix 36. The matrix 36 provides a tightly coupled attitude transformation from the inertially (or earth related) velocity steering signal to the strapped down or body mounted gyros 38. The gyros 38 in turn provide signals to suitable autopilot filters 40 that control the engine gimbal control 42 of a spacecraft for example to adjust the direction of the vehicle accordingly. As the direction of the vehicle is adjusted according to the action of the engine gimbal control 42 the vehicle dynamics are affected accordingly.

An alternate loosely coupled attitude implementation would utilize the autopilot gyros 38 without a transformation matrix generated from the gyro outputs. This arrangement would be suitable for shorter duration, simple maneuvering trajectories. The autopilot roll gyro would maintain approximate roll attitude, and would control programmed roll maneuver prior to pitchover for launch application. The guidance algorithms, from measuring velocity increments, can determine the pitch and yaw attitude of the vehicle trust axis, the thereby vehicle pitch and yaw attitude with some error. This would replace the vehicle thrust attitude measuring function provided by accelerometers in a standard GPS/INS implementation.

Since the GPS provides accurate velocity and position data at low sample rates, the strapped down gyros can then be of much lower quality than the high grade gyros required in a standard space inertial guidance system. The gyro performance can be reduced from approximately 0.1 degree per hour to 10 degrees per hour which is roughly two orders of magnitude.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A guidance system for a flying vehicle which includes:

means to sense from the dynamics of the flying vehicle information relating to the position and the velocity of the vehicle;

a GPS means responsive to the position and velocity information to provide velocity and position vectors and components of the velocity vector;

a guidance algorithm means responsive to the current position and velocity vectors of the vehicle to provide certain steering information and to provide a velocity vector to be gained;

a velocity steering means responsive to the velocity vector to be gained provided by the guidance algorithm means and to components of the velocity vector provided by the GPS to generate a steering rate vector, and means responsive to the steering rate vector provided by the velocity steering means to adjust accordingly the attitude of the flight vehicle.

2. The flying vehicle guidance system of claim 1 wherein the means responsive to the steering rate vector includes:

gyroscope means, and transformation means to tightly couple the velocity steering signal to the gyroscopic means.

3. The flying vehicle guidance system of claim 2 wherein the gyroscope means are strapped down to the body of the flight vehicle.

4. The flying vehicle guidance means of claim 1 wherein the means responsive to the steering rate vector includes a gyroscope means which directly receives the velocity steering signal.

5. The flying vehicle guidance means of claim 1 wherein the flying vehicle is a spacecraft which has an engine gimbal control means and the means responsive to the steering rate vector provided by the velocity steering means is coupled to the engine gimbal control means.

* * * * *